(12) United States Patent
Kourkoulos et al.

(10) Patent No.: US 8,504,962 B1
(45) Date of Patent: Aug. 6, 2013

(54) THROUGH-SILICON VIA ADMITTANCE EXTRACTION

(75) Inventors: Vasileios Kourkoulos, Grenoble (FR); Roberto Suaya, Meylan (FR)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/526,442

(22) Filed: Jun. 18, 2012

(51) Int. Cl.
*G06F 17/50* (2006.01)
(52) U.S. Cl.
USPC ........................... 716/115; 716/110; 716/136
(58) Field of Classification Search
None
See application file for complete search history.

(56) References Cited

U.S. PATENT DOCUMENTS

| | | | | |
|---|---|---|---|---|
| 7,149,666 | B2 * | 12/2006 | Tsang et al. | 703/2 |
| 7,331,023 | B2 * | 2/2008 | Sercu et al. | 716/136 |
| 7,689,949 | B1 * | 3/2010 | Ling et al. | 716/136 |
| 8,352,232 | B2 * | 1/2013 | Han et al. | 703/14 |

OTHER PUBLICATIONS

Banerjee et al., "3-D ICs: A Novel Chip Design for Improving Deep-Submicrometer Interconnect performance and Systems-on-Chip Integration," Proc. of the IEEE, vol. 89. No. 5, May 2001, pp. 602-633.*
Han et al., "Electromagnetic Modeling of Through-Silicon Via (TSV) Interconnections Using Cylindrical Model Basis Functions," IEEE Trans. on Advanced Packaging, vol. 33, No. 4, Nov. 2010, pp. 804-817.*
Kourkoulos et al., "Layered Media Green's Function Approximation in Terms of Spherical & Cylindrical Waves," The Second European Conference on Antennas and Propagation, 2007, 4 pages.*
Manetas et al., "Investigation on the Frequency Range of Validity of Electroquasistatic RC Models for Semiconductor Substrate Coupling Modeling," IEEE Trans. on Electromagnetic Compatibility, vol. 49, No. 3, Aug. 2007, pp. 577-584.*
Palma et al., "Generalization of the electrostatic potential function for an infinite charge distribution," Am. J. Phys. 71 (8), Aug. 2003, pp. 813-815.*
Simon et al., "Efficient Analysis of Periodic Structures Using a Wide-Band Formulation of the Helmholts Green's Function," 1992 IEEE, pp. 192-195.*
Wu et al., "Signal Integrity Analysis of Package and Printed Circuit Board With Multiple Vias in Substrate of Layered Dielectrics," IEEE Trans. on Advanced Packaging, vol. 33, No. 2, May 2012, pp. 510-516.*
Xu et al., "Compact AC Modeling and Performance Analysis of Through-Silicon Vias in 3-D ICs," IEEE Trans. on Electron Devices, vol. 57, No. 12, Dec. 2010, pp. 3405-3417.*
Xu et al., "Compact Modeling and Analysis of Through-Si-Via-Induced Electrical Noise Coupling in Three-Dimensional ICs," IEEE Trans. on Electron Devices, vol. 58, No. 11, Nov. 2011, pp. 4024-4034.*

(Continued)

*Primary Examiner* — Leigh Garbowski

(57) ABSTRACT

Aspects of the invention relate to techniques for extracting admittance values associated with through-silicon vias in an integrated circuit system. A function fitting process is performed to generate parameters of a representation for electroquasi-static potential Green's functions at a plurality of frequencies of interest based on integrated circuit manufacturing process information. Based on the generated parameters, a set of electric potential basis functions, a set of electric displacement basis functions and layout information for a layout design of interest, matrix elements of a matrix for each frequency in the plurality of frequencies of interest may be computed. The matrix is a part of a linear system that formulates a relationship of electric displacement fields and electric potentials in various regions associated with through-silicon vias in the layout design. Based on the matrix, admittance values associated with the through-silicon vias are computed.

20 Claims, 5 Drawing Sheets

Flow chart 500

OTHER PUBLICATIONS

K. A. Michalski and J. R. Mosig, "Multilayered Media Green's Functions in Integral Equation Formulations," IEEE Trans. Antennas and Propagation, vol. 45, No. 3, Mar. 1997, pp. 508-519.

V.N. Kourkoulos and A. C. Cangellaris, "Accurate Approximation of Green's Functions in Planar Stratified Media in Terms of a Finite Sum of Spherical and Cylindrical Waves," IEEE Trans. Antennas and Propagation, vol. 54, No. 5, May 2006, pp. 1568-1576.

V. Kourkoulos and R. Suaya, "Electromagnetic Simulation of 3D ICs, Some Novelties Related to 3D Problems in Stratifed Media," Abstract, in Progress in Electromagnetics Research Symposium (PIERS), Jul. 2010, p. 533.

R. Suaya, C. Xu, V Kourkoulos, K Banerjee, Z. Mahmood and L. Daniel, "Some Results Pertaining Electromagnetic Characterization and Model Building for Passive Systems Including TSVs, for 3-D IC's Applications," IEEE Electrical Design of Advanced Packaging & Systems (EDAPS) Symposium, Hangzhou, China, Dec. 12-14, 2011, 4 pages.

Chuan Xu, Vassilis Kourkoulos, Roberto Suaya and Kaustav Banerjee, "A Fully Analytical Model for the Series Impedance of Through-Silicon Vias with Consideration of Substrate Effects and Coupling with Horizontal Interconnects," IEEE Transactions on Electron Devices, vol. 58, No. 10, pp. 3529-3540, Oct. 2011.

* cited by examiner

THROUGH-SILICON VIA ADMITTANCE EXTRACTION

FIELD OF THE INVENTION

The present invention relates to the field of integrated circuit (IC) design and process technology. Various implementations of the invention may be particularly useful for extracting admittance values associated with through-silicon vias in an IC system.

BACKGROUND OF THE INVENTION

Three-dimensional integrated circuits (3-D ICs) have been shown to reduce on-chip global interconnect lengths and thus alleviate delay and power consumption problems. 3-D ICs can also facilitate the integration of dissimilar technologies (digital, analog, radio-frequency circuits, et al.). In a 3-D IC, multiple active layers or substrates are vertically stacked on top of each other and are interconnected using "short" vertical links These "short" vertical links are referred to as through-silicon vias. Despite being "short", through-silicon vias have high aspect ratios: the radius of a through-silicon via may be in the order of several micrometers while its length is usually over 50 micrometers.

As fabrication technologies for through-silicon vias have progressed, accurate and efficient techniques for through-silicon via admittance extraction are needed for performance evaluation of circuits and systems built in 3-D ICs and for design optimization of 3-D IC interconnections. Conventional admittance extraction techniques may not be able to account for the unique location, size, and shape of through-silicon vias. For example, a significant portion of a through-silicon via is located inside the silicon substrate, increasing substrate effects significantly. The substrate effects may make the admittance a function of frequency. Some of the substrate effects are nonlinear due to the semiconductor nature of the substrate, which may cause the admittance to become bias-voltage dependent. These substrate effects may not be efficiently considered by conventional techniques. There have been efforts and interest that try to problems like the above. However, challenges remain in developing through-silicon via admittance extraction techniques that offer a good mix of speed, accuracy and generality.

BRIEF SUMMARY OF THE INVENTION

Aspects of the invention relate to techniques for extracting admittance values associated with through-silicon vias in an integrated circuit system. According to various implementations of the invention, a function fitting process may be performed to generate parameters of a representation for electro-quasi-static potential Green's functions at a plurality of frequencies of interest based on integrated circuit manufacturing process information. The integrated circuit manufacturing process information comprises electrical characteristics of multi-layer substrates in or through which through-silicon vias in a layout design are to be fabricated. The plurality of frequencies of interest may be determined based on a maximum frequency of interest received. The representation may use a summation involving Hankel functions to represent an integral involving the electro-quasi-static potential Green's functions for the multi-layer substrates. The generated parameters may be saved in a database or a library.

Based on the generated parameters, a set of electric potential basis functions, a set of electric displacement basis functions and layout information for a layout design of interest, matrix elements of a matrix may be computed for each frequency in the plurality of frequencies of interest. The layout design of interest comprises through-silicon vias. The matrix is a part of a linear system that formulates a relationship of electric displacement fields and electric potentials in various regions associated with the through-silicon vias. Both of the set of electric potential basis functions and the set of electric displacement basis functions may be formed by trigonometric functions.

Based on the matrix, admittance values associated with the through-silicon vias are computed. With various implementations of the invention, right-hand-side column vectors of the linear system for each frequency in the plurality of frequencies of interest may first be determined based on the set of electric displacement basis functions and voltages of the through-silicon vias. The linear system may then be solved to derive values for left-hand-side column vectors of the linear system for each frequency in the plurality of frequencies of interest. Finally, the admittance values for the through-silicon vias may be computed based on the values for the left-hand-side column vectors. In some embodiments of the invention, a non-linear least square fit may be performed to derive an admittance netlist based on the admittance values for the plurality of frequencies of interest.

The derived admittance values and/or the admittance netlist may be outputted. The outputting may comprise storing the admittance values in computer memory or storage.

DETAILED DESCRIPTION OF THE INVENTION

General Considerations

Figure 1:
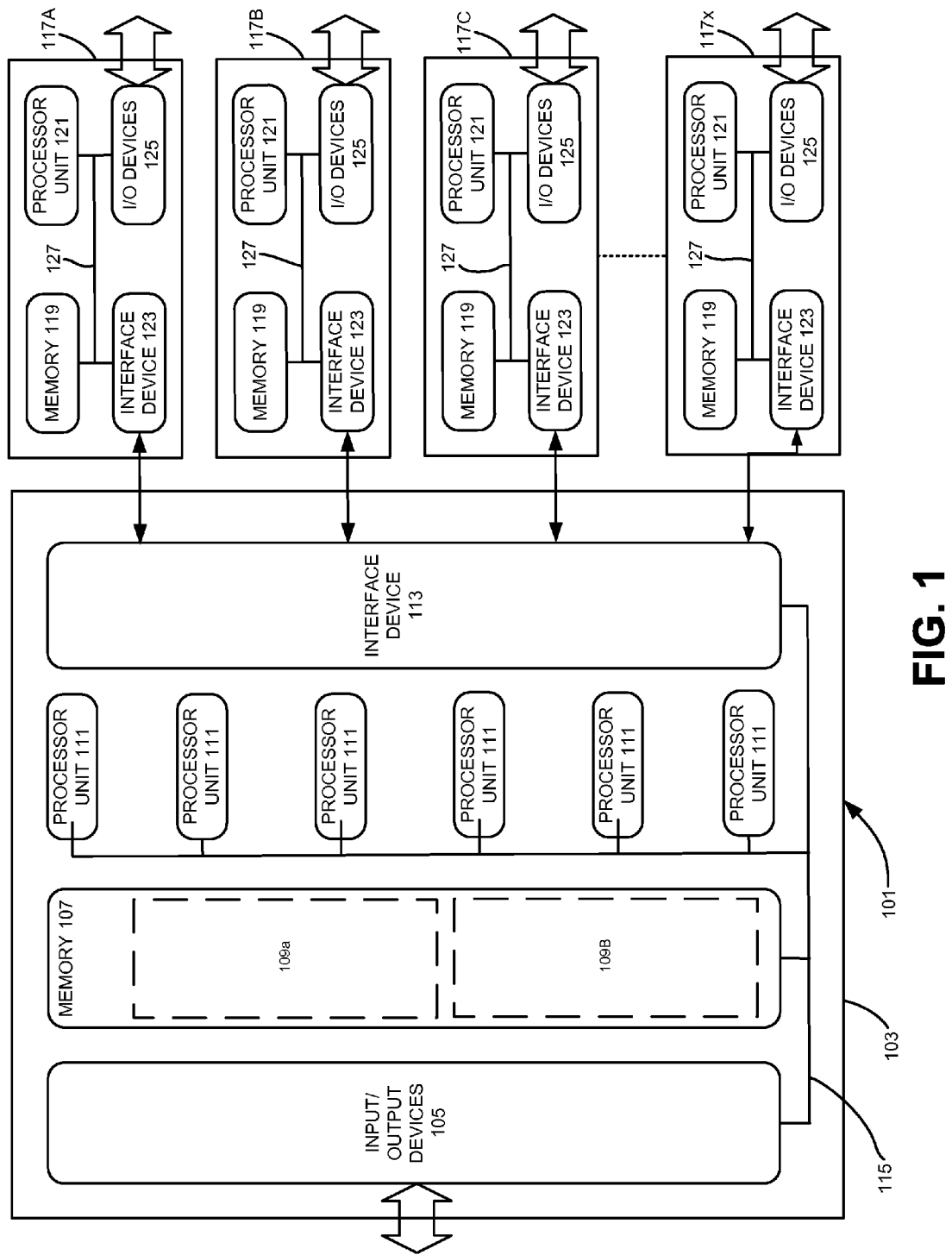
FIG. 1 illustrates an example of a computing system that may be used to implement various embodiments of the invention.

Various aspects of the present invention relate to extracting admittance values associated with through-silicon vias in an IC system. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "partition," "generate" and "associate" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
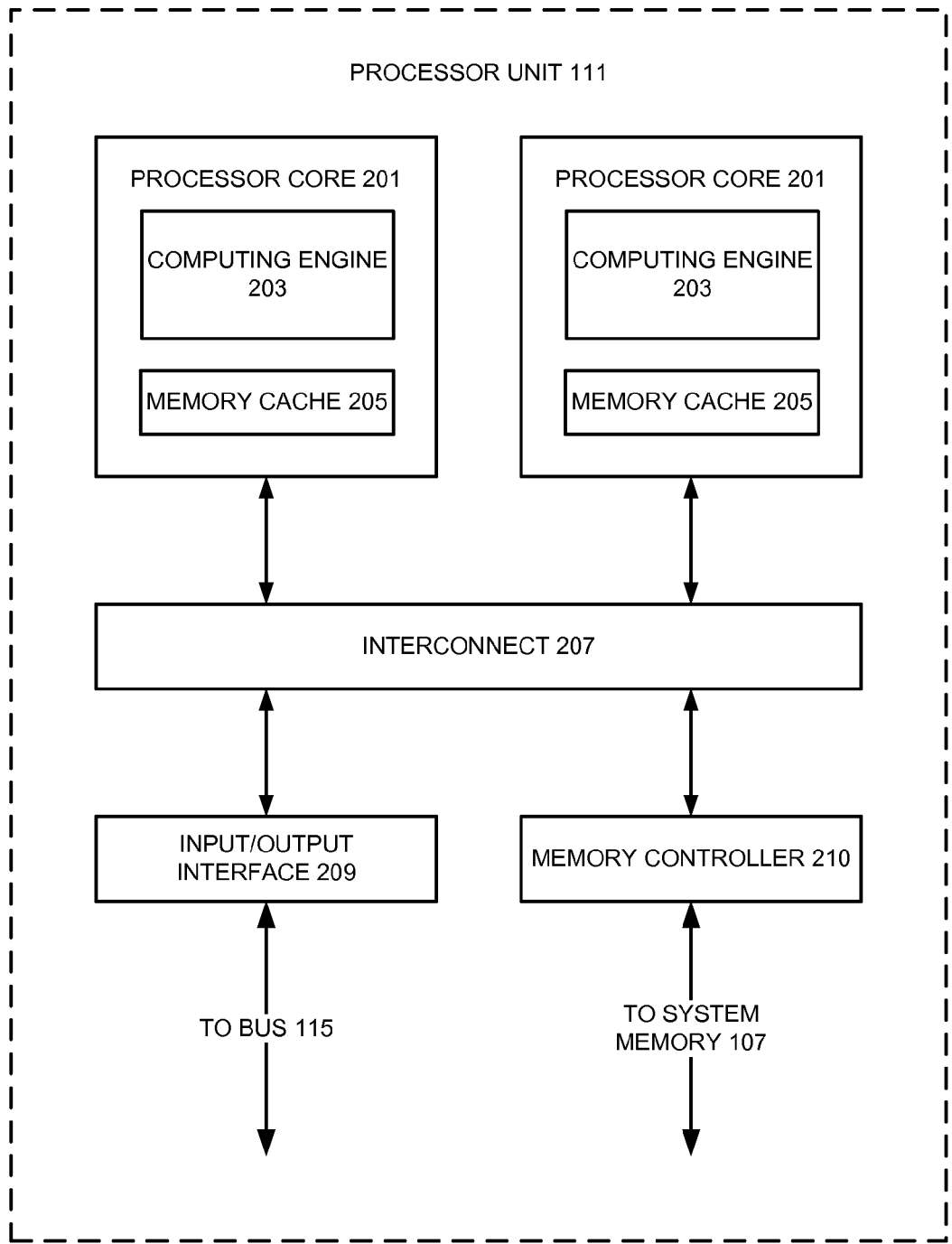
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Through-Silicon Vias and Fundamental Equations for Admittance Extraction

Figures 3A, 3B:
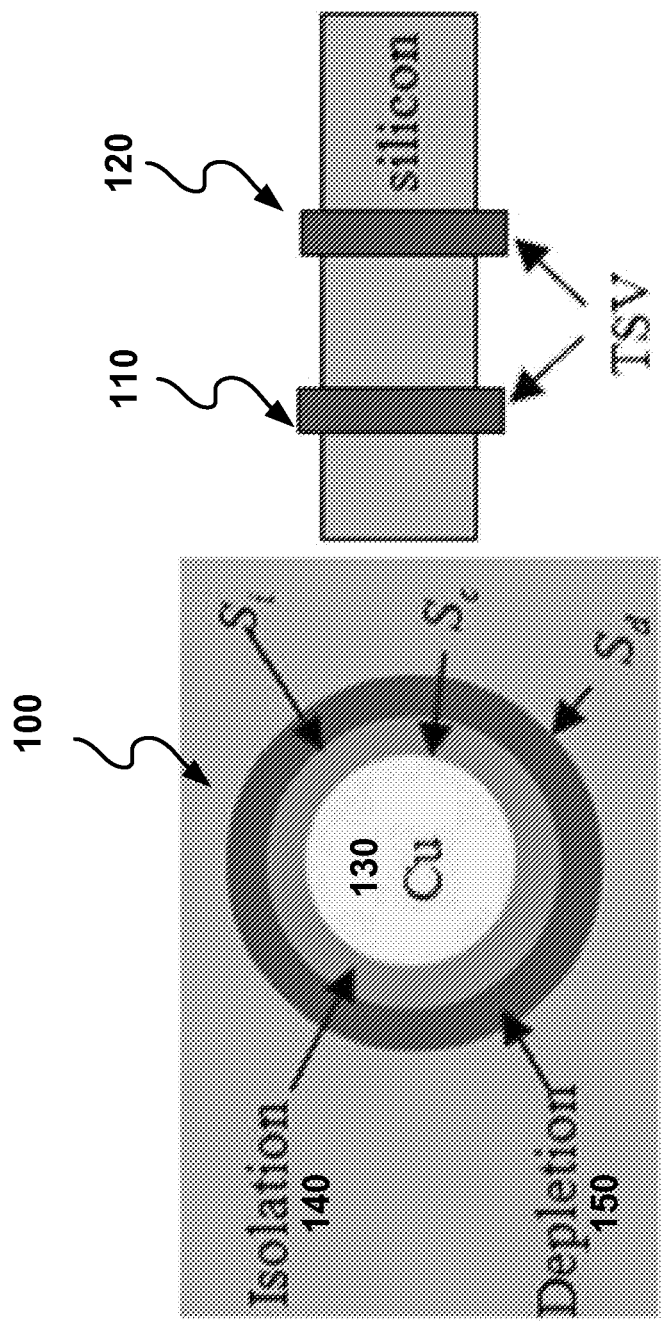
FIG. 3a illustrates an example of a cross section view of a through-silicon via.
FIG. 3b illustrates an example of two neighboring through-silicon vias.

FIG. 3a illustrates an example of a cross section view of a through-silicon via 100 and FIG. 3b illustrates an example of two neighboring through-silicon vias 110 and 120. The conducting core 130 (usually Cu) of the through-silicon via 100 is surrounded by a dielectric layer 140 (usually $SO_2$) for direct-current (DC) isolation. The dielectric layer 140 may in turn be surrounded by a depletion layer 150. The formation of the depletion layer 150 depends on the voltage bias condition, interface charge density, material properties of surrounding Si (n/p-type, electrical conductivity, etc) and geometrical parameters of the through-silicon via 100. The thickness of the depletion layer 150 may be found by solving the Poisson's equation in the depletion layer 150 and the dielectric layer 140 based on boundary conditions. The interfaces between the conducting core 130, the dielectric layer 140, the depletion layer 150 and the bulk substrate 160 are labeled as $S_c$, $S_i$ and $S_d$, respectively.

Through-silicon vias are usually manufactured inside a stack of planar media (multi-layer substrates). This type of structures is commonly referred to as multilayered media structures. Relations have been derived to correlate current and charge densities with the fields in such a way that the boundary conditions at the layer interfaces (for the case of FIG. 3a, the interfaces $S_i$ and $S_d$) are properly satisfied. The formulation of admittance extraction of through-silicon vias is similar to that described in an article by K. A. Michalski and J. R. Mosig, "Multilayered Media Green's Functions in Integral Equation Formulations," IEEE Trans. Antennas and Propagation, vol. 45, no. 3, March 1997 (referred to as Michalski, hereinafter), which is incorporated herein by reference.

With various implementations of the invention, certain simplifications are made: a) the effects of the conductor currents may be ignored, which are accounted for in the solution of the magneto-quasi-static (MQS) problem disclosed in a separate patent application; b) all the layers consist of non-magnetic materials, which are often the case in integrated circuits; and c) the wavenumbers inside the layers are set equal to zero. This last simplification, vanishing wavenumbers inside the layers, reduce the Helmholtz equation in Michalski to the Poisson's equation. The fundamental equations that correlate the charge density $\sigma$, with the potential $\Phi$, and the electric field $\vec{E}$ in the electro-quasi-static (EQS) limit are:

$$\vec{E} = -\nabla \Phi, \qquad (1)$$

$$\Phi(\vec{r}) = \langle K^{\Phi}(\vec{r}, \vec{r}\,'), \sigma(\vec{r}\,') \rangle, \qquad (2)$$

$$K^{\Phi}(\vec{r}, \vec{r}\,') = K^{\Phi}(|\vec{\rho} - \vec{\rho}\,'|, z, z') = F^{-1}\{\tilde{K}^{\Phi}(k_\rho; z, z')\}, \qquad (3)$$

$$\tilde{K}^{\Phi}(k_\rho; z, z') = \frac{-j\omega}{k_\rho^2} \lim_{k_z^2 \to -k_\rho^2} V_i^e(k_\rho, z, z'), \qquad (4)$$

where $K^{\Phi}$ is the electro-quasistatic potential Green's function in multilayered structures; $\langle \cdot \rangle$ denotes integration; $F^{-1}$ the inverse two dimensional Fourier transform in the xy-plane; $k_\rho$ is the spatial angular frequency; $\omega$ is the time angular frequency; z and z' are the vertical coordinates of the observation and of the source points, respectively; $\vec{\rho}$ and $\vec{\rho}\,'$ is the polar coordinate vector for the observation and source points respectively, and $V_i^e$ is a transmission line Green's function defined in Michalski. The Fourier transform $\tilde{K}^{\Phi}$ is known in closed analytical form.

Regarding the boundary conditions, the voltage on the conductor surfaces of each equation is known and constant:

$$\Phi(\vec{r}) = V_c, \vec{r} \in S_c, \qquad (5)$$

where $V_c$ is the voltage of the specific TSV. The normal component of the electric displacement field, $\vec{D}$ at the isolation-depletion region interfaces must be continuous:

$$\hat{n} \cdot \vec{D}(\vec{r}) = \text{continuous}, \vec{r} \in S_i, \qquad (6)$$

The boundary condition at the interface between the depletion region and the substrate may need a special treatment. Consider a closed surface inside a multilayered structure, $S_{out}$. The potential on the surface is $\Phi(\vec{r})$, and the electric displacement field is $\vec{D}(\vec{r})$. Due to the uniqueness theorem, provided that the potential $\Phi(\vec{r})$ does not change, the material inside $S_{out}$ may be replaced with a desirable one such as a material that has electric displacement field normal to the surface equal to zero. Since the displacement field just outside of $S_{out}$ should remain undisturbed, a surface charge density is required on $S_{out}$:

$$\sigma(\vec{r}\,') = \hat{n} \cdot \vec{D}(\vec{r}\,'), \vec{r}\,' \in S_{out} \qquad (7)$$

The potential generated by this charge density inside a multilayered structure is given by equation 2. Substitution of equation 6 into equation 2 leads to the following integral equation:

$$\Phi(\vec{r}) = \langle K^{\Phi}(\vec{r}, \vec{r}\,'), \hat{n} \cdot \vec{D}(\vec{r}\,') \rangle, \vec{r}\,' \in S_{out}, \vec{r} \in S_{out} \qquad (8)$$

The last equation can be regarded as the boundary condition which must be satisfied on the depletion region-substrate interface $S_d$. Provided that equation 8 is satisfied, the boundary conditions at the layer interfaces of the multilayered structure are automatically satisfied. In the case of multiple through-silicon vias, the surface $S_{out}$ is the union of the outer surfaces of all through-silicon vias. It is through equation 8, that the mutual coupling between equations is addressed.

System of Linear Equations Derived Using Method of Moments

The fundamental equations for admittance extraction are transformed to a system of linear equations using the method of moments (MoM). The potential at the dielectric interfaces $S_i$ and $S_d$ is unknown, as is electric displacement field inside the isolation region and the depletion region associated with the through-silicon vias. The unknowns are discretized:

$$\Phi(\vec{r}) = V_c + \sum_{n=1}^{N} \Phi_n B_n^{\Phi}(\vec{r}), \vec{r} \in (S_c \cup S_i \cup S_d), \qquad (9)$$

$$\vec{D}(\vec{r}) = \sum_{n=1}^{N} D_n \vec{B}_n^{D}(\vec{r}), \vec{r} \in (V_i \cup V_d), \qquad (10)$$

where $B_n^{\Phi}$ denotes the basis functions used to discretize the potential and $\vec{B}_n^{D}$ the basis functions used to discretize the electric displacement.

Equation (10) is substituted into (1), and tested with $\vec{B}_m^{D}$:

$$\sum_{n=1}^{N} D_n \langle \vec{B}_m^{D}, \vec{B}_n^{D} / \varepsilon_n \rangle = -\langle \vec{B}_m^{D}, \nabla \Phi \rangle, \qquad (11)$$

where $\varepsilon_n$ is the permittivity of the medium for which $\vec{B}_n^{D}$ has non zero support. Since inside dielectrics the electric displacement has divergence equal to zero, the same restriction on the electric displacement basis functions may be imposed:

$$\nabla \cdot \vec{B}_m^{D} = 0, \qquad (12)$$

Using (12) and the Gauss theorem, the right hand side of (11) is reduced to surface integrals. After expanding the potential in terms of basis function with the use of (9), the following equation is obtained:

$$\sum_{n=1}^{N} D_n \langle \vec{B}_m^D, \vec{B}_n^D / \varepsilon_n \rangle + \sum_{n=1}^{N} \Phi_n \langle \hat{n} \cdot \vec{B}_m^D, B_n^\Phi \rangle = -\langle \hat{n} \cdot \vec{B}_m^D, V_c \rangle, \qquad (13)$$

where $\hat{n}$ is the vector normal to the surface which defines $\vec{B}_m^D$, and points outside the volume of the basis. The integration of the first integral of the left hand side (LHS) of (13) is performed over the common volume of the two electric displacement basis functions, the second integral of the LHS is performed over the surface of the electric potential basis function, and the integral of the right hand side over the conductor surfaces. Equation (13) applies for all possible $\vec{B}_m^D$ and therefore it defines a set of N equations with 2N unknowns.

Provided that the basis functions of the electric flux do not cross any interfaces, the discretization of the boundary condition (6) leads to:

$$\sum_{n=1}^{N} D_n \langle B_m^\Phi, \hat{n} \cdot \vec{B}_n^D \rangle = 0, \; B_m^\Phi \in S_i, \qquad (14)$$

The discretization of equation (8), on the interface $S_d$ leads to:

$$\sum_{n=1}^{N} D_n \langle B_m^\Phi(\vec{r}), \langle K^\Phi(\vec{r}, \vec{r}'), \hat{n} \cdot \vec{B}_n^D(\vec{r}') \rangle \rangle \delta_{n,d} - \sum_{n=1}^{N} \Phi_n \langle B_m^\Phi(\vec{r}), B_n^\Phi(\vec{r}) \rangle = 0, \qquad (15)$$

$$B_m^\Phi \in S_d,$$

where $\delta_{n,d}$ is equal to one if $B_n^D$ has $S_d$ as one of its boundaries and zero otherwise.

The equations (13), (14) and (15) could be summarized in the following matrix equation:

$$\begin{pmatrix} A^{DD} & A^{D\Phi} \\ A^{\Phi D} & A^{\Phi\Phi} \end{pmatrix} \begin{pmatrix} x^D \\ x^\Phi \end{pmatrix} = \begin{pmatrix} F^D \\ 0 \end{pmatrix}, \qquad (16)$$

where $x^D$ and $x^\Phi$ are column vectors containing the unknowns $D_n$ and $\Phi_n$ respectively. Each element in the matrix on the left hand side of equation (16) is also a matrix (referred to as sub-matrix). The elements of the sub-matrices are given by the following equations:

$$(A^{DD})_{mn} = \langle \vec{B}_m^D, \vec{B}_n^D / \varepsilon_n \rangle, \qquad (17)$$

$$(A^{D\Phi})_{mn} = \langle \hat{n} \cdot \vec{B}_m^D, B_n^\Phi \rangle, \qquad (18)$$

$$(A^{\Phi D})_{mn} = \begin{cases} \langle B_m^\Phi(\vec{r}), \langle K^\Phi(\vec{r}, \vec{r}'), \hat{n} \cdot \vec{B}_n^D(\vec{r}') \rangle \rangle \delta_{n,d}, B_m^\Phi \in S_d, \\ \langle B_m^\Phi, \hat{n} \cdot \vec{B}_n^D \rangle, B_m^\Phi \in S_i \end{cases} \qquad (19)$$

$$(A^{\Phi\Phi})_{mn} = \begin{cases} 0, B_m^\Phi \in S_d \\ -\langle B_m^\Phi, B_n^\Phi \rangle, B_m^\Phi \in S_i, \end{cases} \qquad (20)$$

$$(F^D)_m = -\langle \hat{n} \cdot \vec{B}_m^D, V_c \rangle, \qquad (21)$$

The solution of (16) will define the electric displacement field inside the isolation region. Since the charge density on a conductor through-silicon via is equal to the normal component of the electric displacement field, the total charge on the surface of the through-silicon via can be easily determined. From the total charge (a complex quantity in the quasi-static problem) the admittance may be determined. The correlation of the conventional capacitance C and conductance G to the admittance, $Y = G + j\omega C$, is as follows:

$$C = Re\{\tilde{C}\}, \qquad (22)$$

$$G = -\omega Im\{\tilde{C}\}. \qquad (23)$$

Basis Functions and Closed Form Expressions for MoM Matrix

The matrix in equation 16 may be referred to as a MoM matrix. The computation of the elements of the MoM matrix defined by equations (17)-(20) is expensive using conventional methods, especially for the first integral of equation (19). Appropriate choices for the basis functions along with a fitting process may, however, allow all the elements of the system of (16) to be computed in closed form.

With various implementations of the invention, the basis functions may be selected considering the fact that through-silicon vias are discretized parallel to the z axis and that each "element" of this discretization also looks like a through-silicon via (with the conductor surface, isolation and depletion regions). For each cylindrical surface $S_i$ and $S_d$ of each through-silicon via and for all through-silicon vias, the potential basis functions have the following form:

$$B^\Phi = \cos(l\phi_b) \text{ or } \sin(l\phi_b), \qquad (24)$$

where l is a positive integer (we will refer to this integer as order of basis) and $\phi_b$ is the polar angle for the specific through-silicon via. The lowest order of basis is the zeroth order and corresponds to a constant potential on the surface of the basis.

The electric displacement basis functions inside the isolation and depletion regions have the following form:

$$\vec{B}^D = \begin{cases} \frac{1}{\rho_b} \hat{\rho}_b \\ P_l\left(\frac{\rho_b}{\rho_{in}}\right) \cos(l\phi_b) \hat{\rho}_b - Q_l\left(\frac{\rho_b}{\rho_{in}}\right) \sin(l\phi_b) \hat{\phi}_b, \\ P_l\left(\frac{\rho_b}{\rho_{in}}\right) \sin(l\phi_b) \hat{\rho}_b + Q_l\left(\frac{\rho_b}{\rho_{in}}\right) \cos(l\phi_b) \hat{\phi}_b \end{cases} \qquad (25)$$

where the quantity $\rho_{in}$ is the inner radius of the hollow cylinder, for which the basis function is defined. For example, if the basis function represents the flux in the isolation (depletion) region, $\rho_{in}$ is the radius of $S_c(S_i)$. The quantities $\rho_b$, $\hat{\rho}_b$, $\hat{\phi}_b$ correspond to $\rho$, $\hat{\rho}$, $\hat{\phi}$ of the cylindrical system located at the center of the through-silicon via. The basis functions of (25) are consistent with the zero-divergence requirement we imposed earlier.

The above basis functions allow most of the integrals in equations (17)-(20) to be computed in closed forms. The exception is the first integral of equation (19). Each integral of (19) could be written with a difference of a multiplication constant in the following form:

$$I = \int_0^{2\pi} d\varphi_t T(\varphi_t) \int_0^{2\pi} \varphi_b B(\varphi_b) \int_{z_c}^{z_d} dz \int_{z_a}^{z_b} dz' K^\Phi(|\vec{\rho} - \vec{\rho}'|, z, z'), \qquad (26)$$

where functions $T(\phi_t)$ and $B(\phi_b)$ are cosines or sines (depending on the form of the basis and testing functions) similar to (24); $[z_a, z_b]$ is the interval in the z-axis in which the basis function $\vec{B}_n^D$ has non-zero support and $[z_c, z_d]$ is the interval in the z-axis in which the testing function $\vec{B}_m^D$ has non-zero support.

As mentioned earlier the double integral of the Green's function along z and z', i.e., the inner most double integral of (26), is not known in closed form. Fortunately, its Fourier transform is:

$$\int_{z_c}^{z_d} dz \int_{z_a}^{z_b} dz' \tilde{K}^\Phi(k_\rho, z, z') = \qquad (27)$$

$$\lim_{k_z^2 \to -k_\rho^2} \left\{ \frac{1}{\varepsilon_a k_z^2} \frac{1}{j\omega \varepsilon_c} [I_v^e(z_d; z_b) - I_v^e(z_c; z_b) - I_v^e(z_d; z_a) + I_v^e(z_c; z_a)] - \frac{1}{\varepsilon_a k_z^2} I_c(z_a, z_b, z_c, z_d) \right\}$$

where $\in_a$ and $\in_c$ are the permittivity constants for the layers of $z_a$ and $z_c$ respectively, and the functions $I_v^e$ have been defined in Michalski. Based on the rational function fitting method presented in V. N. Kourkoulos, and A. C. Cangellaris, "Accurate Approximation of Green's Functions in Planar Stratified Media in Terms of a Finite Sum of Spherical and Cylindrical Waves," *IEEE Trans. Antennas and Propagation*, vol. 54, no. 5, May 2006 (referred to as Kourkoulos, hereinafter), which is incorporated herein by reference, equation (27) may be expressed as:

$$\int_{z_c}^{z_d} dz \int_{z_a}^{z_b} dz' \tilde{K}^\Phi(k_\rho, z, z') \approx \sum_{k=1}^{K} \frac{r_k}{k_\rho^2 - p_k^2} \qquad (28)$$

For typical multilayered structures, K=10 may provide an excellent fit for the analytic expression of the left hand side of (28). The benefit of (28) is apparent as the Fourier transform of the right hand side of (28) is known analytically. More specifically it is a summation of Hankel functions of zeroth order and second kind $H_0^{(2)}$. Taking the Fourier transform of both sides of (28) yields:

$$\int_{z_c}^{z_d} dz \int_{z_a}^{z_b} dz' K^\Phi(|\vec{\rho} - \vec{\rho}'|, z, z') = \frac{-j}{4} \sum_{k=1}^{K} r_k H_0^{(2)}(p_k|\vec{\rho} - \vec{\rho}'|) \qquad (29)$$

Substitution of (29) into (26) leads to:

$$I = \frac{-j}{4} \sum_{k=1}^{K} r_k I_k \qquad (30)$$

$$I_k = \int_0^{2\pi} d\varphi_t T(\varphi_t) \int_0^{2\pi} \varphi_b B(\varphi_b) H_0^{(2)}(p_k|\vec{\rho} - \vec{\rho}'|) \qquad (31)$$

where the integrals of (31) are line integrals of products of Hankel Functions and trigonometric functions on circles. The circles are defined by the projections of the basis and of the testing functions on the xy-plane. These types of integrals can be computed in closed form with use of the addition's theorem for Bessel functions.

The derivations are tedious. The final results are provided for the following two relevant cases, a) case 1 where the circle of the testing is inside or on the circle of the basis (interactions among basis functions of the same through-silicon via fall in this category) and b) case 2 where the circles of the testing and of the basis functions do not have any common points (mutual interactions, among basis of different through-silicon vias in the same substrate fall in this category):

$$I_k = 2\pi^2 A_l(p_k a_b) \cdot J_i(p_k a_t) \cdot [C_{l+i}(p_k \rho_{diff}) \cdot T_1(i\pi + l\phi_{diff} + \phi_{diff}) \cdot G + C_{l-i}(p_k \rho_{diff}) \cdot T_1(-i\phi_{diff} + l\phi_{diff}) \cdot H] \qquad (32)$$

where $a_b$, $a_t$ is the radius of the basis and testing function, respectively; $\rho_{diff}$ is the length of the vector $\vec{\rho}_{diff}$, the projection on the xy-plane of the vector from the center of the basis to the center of the testing; $\phi_{diff}$ is the angle formed by vector $\vec{\rho}_{diff}$ and the x-axis; $J_i$ is the Bessel function of order i; symbol "A" denotes the Hankel function of second kind for case 1 and the Bessel function for case 2; symbol "C" denotes the Bessel function for case 1 and Hankel function of second kind for case 2; function $T_1$ denotes a cosine if both basis and testing are of the same type e.g. both cosines or both sines, and denotes a sine otherwise; G is equal to minus one if both testing and basis are sines and plus one otherwise; H is equal to minus one if the testing is a sine and the basis a cosine and zero otherwise.

There are two remaining cases. The first of the remaining two cases is the one where the circle of the basis is inside the circle of the testing and can be reduced to case 1. The second of the remaining two cases is the one where the two circles intersect each other. This could happen only if the outer surfaces of two through-silicon vias, when projected in the xy-plane, produce circles overlapping with each other. Analytical expressions for this case do exist but they are more involved, than those for cases 1 and 2. This case is of little interest, since it could happen only for through-silicon vias between different layers, and for this case the capacitive effects should be negligible, due to shielding effects by the metal layers.

Equations (30) and (32) show the four dimensional integral of equation (26) for the matrix elements of the linear system can be reduced to a closed form expression. This simplification comes at a small extra cost—non-linear fitting similar to equation (28). The fitting process depends on the discretization of the through-silicon vias along the z-axis, and on material properties of the multilayered structure. Because all through-silicon vias inside the same layer could share the same z-axis discretization, the discretization of the through-silicon vias in the z-axis could be considered as discretization of the multilayered structure along the z-axis. Therefore, the required fitting process may depend only on the material properties of the multilayered structure and the frequency, not on the locations and the properties of the through-silicon vias. Taking advantage of this property, libraries containing the poles and the residues for each multilayered structure may be created first. If the multilayered structure (substrate profile) has been encountered before, the poles and the residues of (28) are retrieved from the library instead of being recomputed. Accordingly, the computational cost of (26) may just be the computation cost of (30) and (32).

It should be noted an electro-quasi-static problem in an isotropic, non-homogeneous media is defined by the following equation:

$$\nabla \cdot \left\{ \varepsilon(\vec{r}) \left[ 1 - j\frac{\sigma(\vec{r})}{\omega} \right] \nabla [\Phi(\vec{r})] \right\} = -\rho(\vec{r}'), \quad (33)$$

where $\sigma(\vec{r})$ is the conductivity of space at the observation point $\vec{r}$ and $\rho(\vec{r}')$ is the volume charge density at point $\vec{r}'$. With use of the definition of the loss tangent:

$$\tan\delta(\vec{r}) \equiv \frac{\sigma(\vec{r})}{\omega\varepsilon(\vec{r})}, \quad (34)$$

equation (33) could be written as:

$$\nabla \cdot \{\varepsilon(\vec{r})[1-j\tan\delta(\vec{r})]\nabla[\Phi(\vec{r})]\} = -\rho(\vec{r}'), \quad (35)$$

Based on (35), the complex capacitance should not change provided that the loss tangent doesn't change. Because of equations (22) and (23), the same applies to the conventional capacitance and the ratio of conductance over frequency. Accordingly, from a capacitance (or conductance over frequency) curve as a function of frequency for a substrate of conductivity of 15 S/m, the same curve for a conductivity of 1.5 or 150 S/m could be easily obtained. This can be done by multiplying the frequency axis by a factor that will result in the same loss tangent.

Admittance Extraction Tools and Methods

Figure 4:
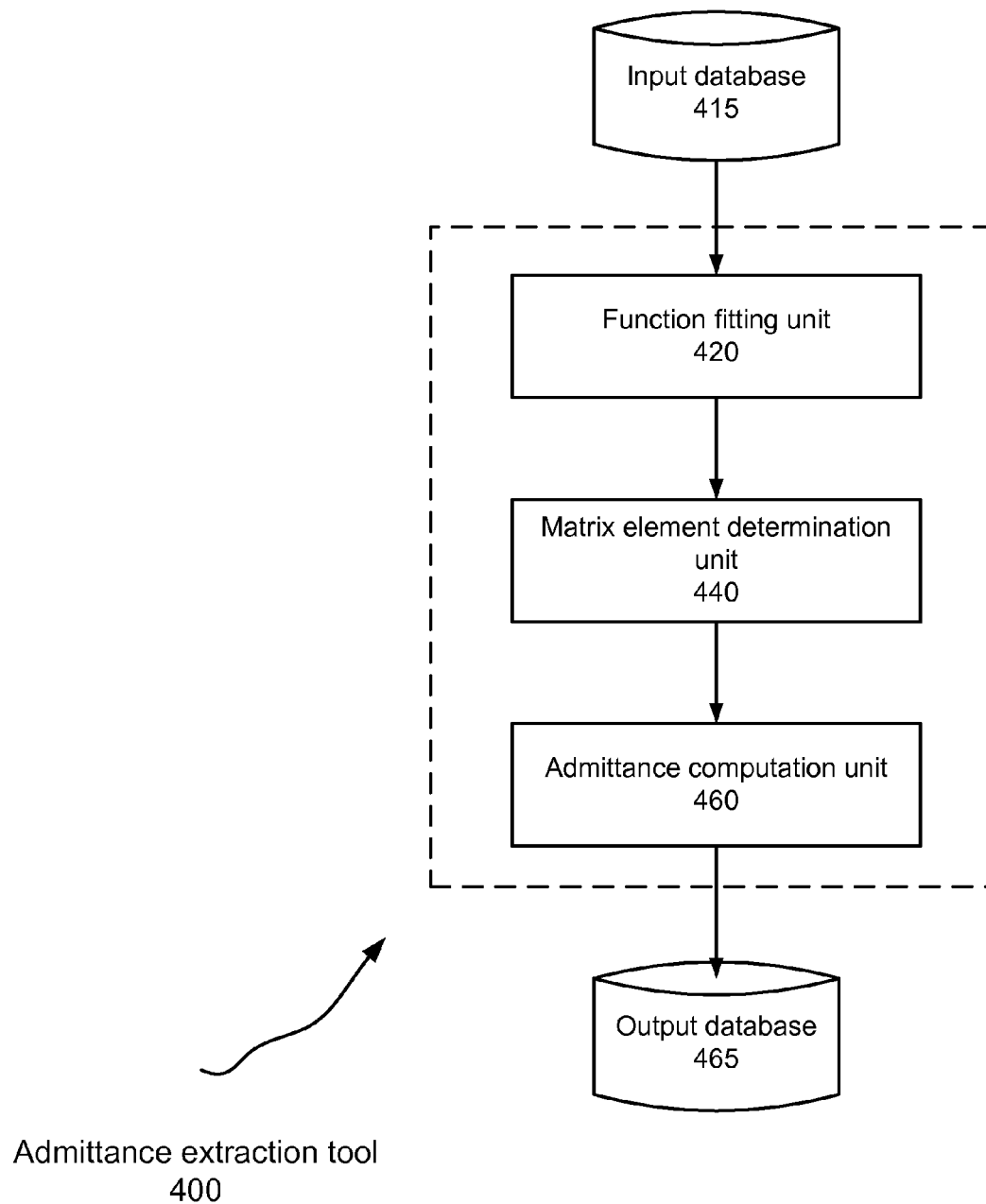
FIG. 4 illustrates an admittance extraction tool that may be employed according to various embodiments of the invention.

FIG. 4 illustrates an example of an admittance extraction tool according to various embodiments of the invention. As seen in the figure, the admittance extraction tool 400 includes three units: a function fitting unit 420, a matrix element determination unit 440, and an admittance computation unit 460. As will be discussed in more detail below, some implementations of the admittance extraction tool 400 may cooperate with (or incorporate) one or both of an input database 415 and an output database 465. While the input database 415 and the output database 465 are shown as separate units in FIG. 4, a single data storage medium may be used to implement some or all of these databases.

According to some embodiments of the invention, one or more of the function fitting unit 420, the matrix element determination unit 440, and the admittance computation unit 460 may be implemented by executing programming instructions on one or more programmable computers/computer systems, such as the computing system illustrated in FIG. 1 and FIG. 2. Correspondingly, some other embodiments of the invention may be implemented by software instructions, stored on a non-transitory computer-readable medium, for instructing one or more programmable computers/computer systems to perform the functions of one or more of the function fitting unit 420, the matrix element determination unit 440, and the admittance computation unit 460. As used herein, the term "non-transitory computer-readable medium" refers to computer-readable medium that are capable of storing data for future retrieval, and not propagating electromagnetic waves. The non-transitory computer-readable medium may be, for example, a magnetic storage device, an optical storage device, a "punched" surface type device, or a solid state storage device.

Figure 5:
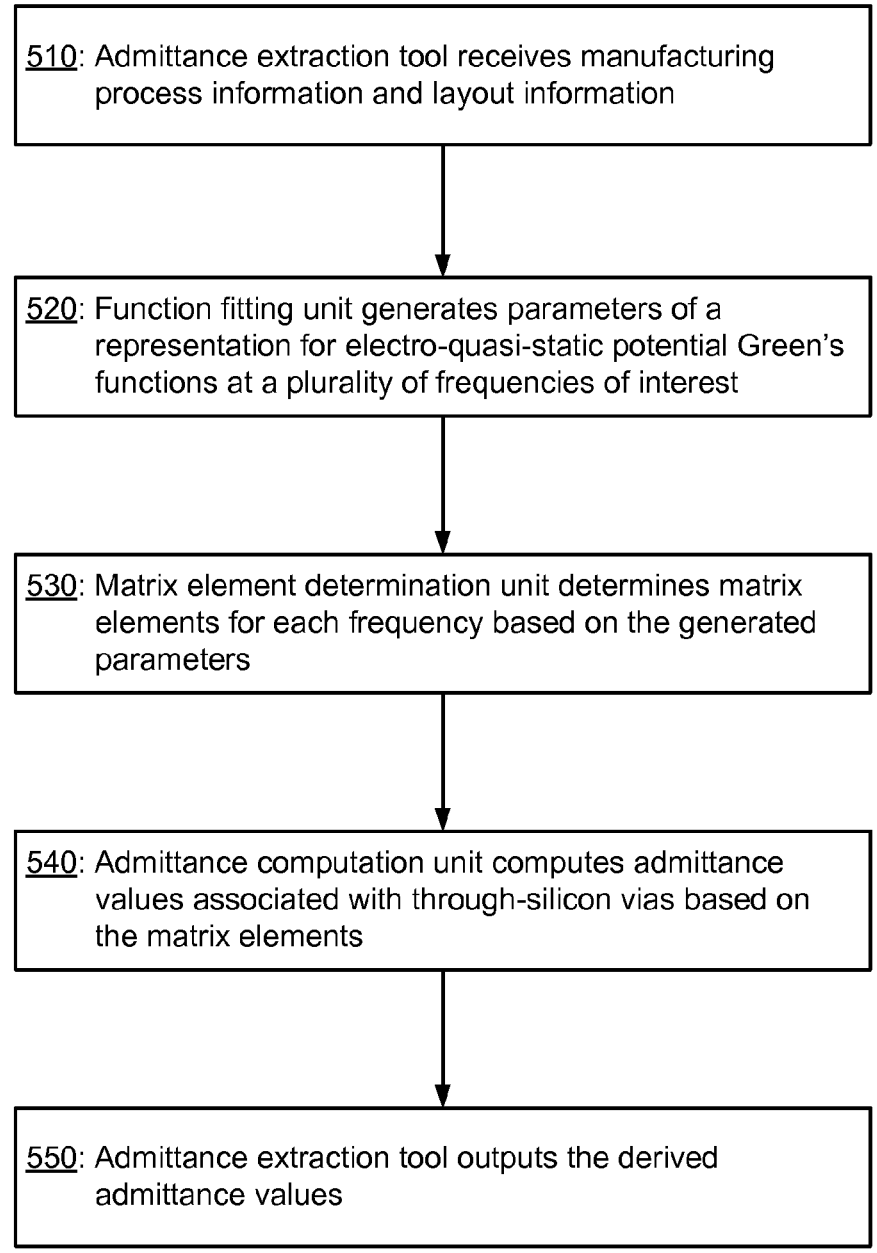
FIG. 5 illustrates a flowchart describing methods for admittance extraction that may be employed by various embodiments of the invention.

For ease of understanding, admittance extraction methods that may be employed according to various embodiments of the invention will be described with reference to the admittance extraction tool 400 illustrated in FIG. 4 and the admittance extraction method shown in the flow chart 500 in FIG. 5. It should be appreciated, however, that alternate implementations of an admittance extraction tool may be used to the admittance extraction method shown in the flow chart 500 according to various embodiments of the invention. In addition, it should be appreciated that implementations of the admittance extraction tool 400 may be employed with other methods for admittance extraction according to different embodiments of the invention.

Initially, in operation 510, the admittance extraction tool 400 receives integrated circuit manufacturing process information and layout information of a layout design. The integrated circuit manufacturing process information comprises material properties such as electrical characteristics of multi-layer substrates in or through which through-silicon vias in the layout design are to be fabricated. Different circuits may be fabricated using the same type of multi-layer substrates. Thus, this information may be used for through-silicon vias admittance extraction of other layout designs. The integrated circuit manufacturing process information and layout information may be received concurrently. Alternatively, the layout information may be received later when needed.

Next, in operation 520, the function fitting unit 420 performs a function fitting process to generate parameters of a representation for electro-quasi-static potential Green's functions at a plurality of frequencies of interest based on the integrated circuit manufacturing process information. The representation uses a summation involving Hankel functions to represent an integral involving the electro-quasi-static potential Green's functions. Equation (29) is an example of such an representation: the integral of the electro-quasi-static potential Green's function $K^\Phi$ equals a summation of K Hankel functions of zeroth order and second kind $H_0^{(2)}$. The parameters of the representation, the residues $r_k$ and the poles $p_k$, may be obtained based on function-fitting of the Fourier transform of the electro-quasi-static potential Green's function, $\tilde{K}^\Phi$, which has a closed analytic form in equation (28).

A detailed explanation of the rational function fitting method may be found in Kourkoulos. As noted earlier, the function fitting process depends on the material properties of the multilayered structure and the frequency included in the integrated circuit manufacturing process information. A library or database containing the poles and the residues for each multilayered structure may be created for processing different circuit designs. This can reduce the computational cost of the through-silicon via admittance extraction.

Next, in operation 530, the matrix element determination unit 440 computes matrix elements of a matrix for each frequency in the plurality of frequencies of interest based on the generated parameters, a set of electric potential basis functions, a set of electric displacement basis functions and the layout information. The matrix is a part of a linear system that formulates a relationship of electric displacement fields and electric potentials in various regions associated with the through-silicon vias. Equation (16) is an example of the linear system of which the left hand side includes the matrix. To determine the matrix elements, the matrix element determination unit 440 may select functions shown in equations (24) and (25) as the set of electric potential basis functions and the set of electric displacement basis functions, respectively. Most of the matrix elements can be computed in closed forms based on equations (17)-(21). The first integral in equation (19) may be computed based on, for example, equation (32) in a closed form along with the generated parameters, the residues $r_k$ and the poles $p_k$.

Next, in operation 540, the admittance computation unit 460 computes admittance values associated with the through-silicon vias based on the matrix. With various implementations of the invention, the admittance computation unit 460 may first compute the right-hand-side column vectors of equation (16) based on the set of electric displacement basis functions and voltages of the through-silicon vias. Each of the right-hand-side column vectors corresponds to voltage of one through-silicon via being set at 1 volt and voltages of the rest being set at 0 volt.

As the matrix is known, the linear system may then be solved using conventional linear algebra methods. The solution provides the electric displacement field values inside the isolation region. The charge density on the conductor part of a through-silicon via is equal to the normal component of the electric displacement field. The total charge on the through-silicon via may then be obtained. Based on the total charge, the admittance, including conventional capacitance and conductance, may be derived.

The operations 530 and 540 may be performed consecutively for each frequency of interest. Alternatively, the operation 530 may be performed for all of the plurality of frequencies of interest before the operation 540 is performed.

In operation 550, the admittance extraction tool 400 outputs the admittance values. For example, the admittance values can be stored in one or more computer-readable storage media (e.g., volatile or nonvolatile memory or storage), e.g., the output database 465 in FIG. 4.

In some embodiments of the invention, the admittance extraction tool 400 may also perform a non-linear least square fit to derive an admittance netlist based on the admittance values for the plurality of frequencies of interest.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, cylindrical through-silicon vias are used as examples for admittance extractions. The methods disclosed here may be applied to other structures similar to cylindrical through-silicon vias such as cylindrical copper pillars. Conical through-silicon vias, copper pillars and micro-bumps could also be approximated as a set of cylinders of different radii.

What is claimed is:

1. One or more processor-readable storage media storing computer-executable instructions for causing one or more processors to perform a method, the method comprising:
receiving integrated circuit manufacturing process information and layout information of a layout design, the integrated circuit manufacturing process information comprising electrical characteristics of multi-layer substrates in or through which through-silicon vias in the layout design are to be fabricated;
performing a function fitting process to generate parameters of a representation for electro-quasi-static potential Green's functions at a plurality of frequencies of interest based on the integrated circuit manufacturing process information, the representation using a summation involving Hankel functions to represent an integral involving the electro-quasi-static potential Green's functions;
computing matrix elements of a matrix for each frequency in the plurality of frequencies of interest based on the generated parameters, a set of electric potential basis functions, a set of electric displacement basis functions and the layout information, the matrix being a part of a linear system that formulates a relationship of electric displacement fields and electric potentials in various regions associated with the through-silicon vias;
computing admittance values associated with the through-silicon vias based on the matrix; and
outputting the admittance values.

2. The one or more processor-readable storage media recited in claim 1, wherein both of the set of electric potential basis functions and the set of electric displacement basis functions include trigonometric functions.

3. The one or more processor-readable storage media recited in claim 1, wherein the computing admittance values comprises:
determining right-hand-side column vectors of the linear system for each frequency in the plurality of frequencies of interest based on the set of electric displacement basis functions and voltages of the through-silicon vias;
solving the linear system to derive values for left-hand-side column vectors of the linear system for each frequency in the plurality of frequencies of interest; and
computing admittance values for the through-silicon vias based on the values for the left-hand-side column vectors.

4. The one or more processor-readable storage media recited in claim 1, wherein the method further comprises:
performing a non-linear least square fit to derive an admittance netlist based on the admittance values for the plurality of frequencies of interest.

5. The one or more processor-readable storage media recited in claim 1, wherein the plurality of frequencies of interest is determined based on a maximum frequency of interest received.

6. The one or more processor-readable storage media recited in claim 5, wherein the plurality of frequencies of interest is determined further based on the integrated circuit manufacturing process information.

7. The one or more processor-readable storage media recited in claim 1, wherein the outputting comprises storing the admittance values in computer memory or storage.

8. The one or more processor-readable storage media recited in claim 1, wherein the method further comprises:
storing the generated parameters in a database.

9. A method of admittance extraction, comprising:
with a computer,
receiving integrated circuit manufacturing process information and layout information of a layout design, the integrated circuit manufacturing process information comprising electrical characteristics of multi-layer substrates in or through which through-silicon vias in the layout design are to be fabricated;
performing a function fitting process to generate parameters of a representation for electro-quasi-static potential Green's functions at a plurality of frequencies of interest based on the integrated circuit manufacturing process information, the representation using a summation involving Hankel functions to represent an integral involving the electro-quasi-static potential Green's functions;
computing matrix elements of a matrix for each frequency in the plurality of frequencies of interest based on the generated parameters, a set of electric potential basis functions, a set of electric displacement basis functions and the layout information, the matrix being a part of a linear system that formulates a relationship of electric displacement fields and electric potentials in various regions associated with the through-silicon vias;

computing admittance values associated with the through-silicon vias based on the matrix; and outputting the admittance values.

10. The method recited in claim 9, wherein both of the set of electric potential basis functions and the set of electric displacement basis functions include trigonometric functions.

11. The method recited in claim 9, wherein the computing admittance values comprises:

determining right-hand-side column vectors of the linear system for each frequency in the plurality of frequencies of interest based on the set of electric displacement basis functions and voltages of the through-silicon vias;

solving the linear system to derive values for left-hand-side column vectors of the linear system for each frequency in the plurality of frequencies of interest; and computing admittance values for the through-silicon vias based on values for the left-hand-side column vectors.

12. The method recited in claim 9, further comprising:

performing a non-linear least square fit to derive an admittance netlist based on the admittance values for the plurality of frequencies of interest.

13. The method recited in claim 9, wherein the plurality of frequencies of interest is determined based on a maximum frequency of interest received.

14. The method recited in claim 9, wherein the outputting comprises storing the admittance values in computer memory or storage.

15. The method recited in claim 9, further comprising:

storing the generated parameters in a database.

16. A system comprising one or more processors, the one or more processors programmed to perform a method of admittance extraction, the method comprising:

receiving integrated circuit manufacturing process information and layout information of a layout design, the integrated circuit manufacturing process information comprising electrical characteristics of multi-layer substrates in or through which through-silicon vias in the layout design are to be fabricated;

performing a function fitting process to generate parameters of a representation for electro-quasi-static potential Green's functions at a plurality of frequencies of interest based on the integrated circuit manufacturing process information, the representation using a summation involving Hankel functions to represent an integral involving the electro-quasi-static potential Green's functions;

computing matrix elements of a matrix for each frequency in the plurality of frequencies of interest based on the generated parameters, a set of electric potential basis functions, a set of electric displacement basis functions and the layout information, the matrix being a part of a linear system that formulates a relationship of electric displacement fields and electric potentials in various regions associated with the through-silicon vias;

computing admittance values associated with the through-silicon vias based on the matrix; and outputting the admittance values.

17. The system recited in claim 16, wherein both of the set of electric potential basis functions and the set of electric displacement basis functions include trigonometric functions.

18. The system recited in claim 16, wherein the computing admittance values comprises:

determining right-hand-side column vectors of the linear system for each frequency in the plurality of frequencies of interest based on the set of electric displacement basis functions and voltages of the through-silicon vias;

solving the linear system to derive values for left-hand-side column vectors of the linear system for each frequency in the plurality of frequencies of interest; and computing admittance values for the through-silicon vias based on the values for the left-hand-side column vectors.

19. The system recited in claim 16, wherein the method further comprises:

performing a non-linear least square fit to derive an admittance netlist based on the admittance values for the plurality of frequencies of interest.

20. The system recited in claim 16, wherein the plurality of frequencies of interest is determined based on a maximum frequency of interest received.

* * * * *